2,728,729

WALL PAPER CLEANER

W Kedzie Teller, Riverside, Ill., assignor to Alphonse J. Saxer

No Drawing. Application August 31, 1950, Serial No. 182,615

2 Claims. (Cl. 252—154)

The invention relates to a novel composition of matter for cleaning wall surfaces, whether plastered, papered, painted, or otherwise. Such compositions are usually sold under the conventional term "wall paper cleaners," but will be occasionally referred to herein as "wall cleaners," this latter term being intended to include any cleanable wall surface covering.

An object of the present invention is to provide a wall cleaner substantially free from crumbling during use.

A further object of the invention is to provide a wall cleaner which does not smudge or stain the surface being cleaned and which does not adhere to the surface.

A further object of the invention is to provide a wall cleaner characterized by especially favorable cleaning action.

A further object of the invention is to provide a wall cleaner which does not require tiresome kneading before use, even after a long period of storage.

A further object of the invention is to provide a composition of matter for a wall cleaner, said composition being adapted to be compounded readily and cheaply, so that it competes favorably, from the price standpoint, with cleaners at present available, while giving superior performance.

Other objects and advantages will be apparent from the following description of the invention.

The composition of matter which is the subject of the present invention is made up from the ingredients listed below, the desirable amount of each ingredient and the specific manner of compounding these ingredients being described in more detail hereinafter. The preferred ingredients are flour, bentonite, alum, urea, kerosene, wax, water and salt. Substitution of equivalent ingredients is permitted in certain instances, as will appear.

The amount of the various ingredients is determinable from the following tabulation:

| | | |
|---|---|---|
| Water | cc | 380 to 470 |
| Flour | grams | 270 to 300 |
| Bentonite | do | 100 to 130 |
| Alum | do | 6.5 to 8.0 |
| Urea | do | 4.0 to 6.0 |
| Kerosene | cc | 8.0 to 12.0 |
| Wax | cc | 8.0 to 12.0 |
| Salt (sodium chloride) | grams | 180 to 190 |

Suitable coloring material may be added, as desired, of a character and in an amount such that it does not materially affect the useful properties of the composition. One such suitable dye is an aniline dye sold under the name of Rhodamine B.

A preferred composition within the above range is made up as follows: A suitable vessel is provided, such as a water-jacketed or steam-jacketed kettle, and in this kettle is placed 433 cc. of water, and 186 grams of salt and 7 grams of ammonium aluminum sulfate. The temperature of the mixture is raised to 205° F., after which 130 grams of dry powdered bentonite is added. The addition of the bentonite reduces the temperature to between 180° F. and 185° F. whereupon there is added 4 grams of urea, 10 cc. of kerosene, and 10 cc. of melted paraffin wax, which in this particular instance weighed 7.9 grams. At this stage the temperature of the mix should be from 178° F. to 180° F.

Without further application of heat there is added 270 grams of wheat flour and mixing is continued for from 55 to 60 seconds, after which the mix is in a semi-solid condition. The mix is thereupon removed from the kettle and passed through a grinding machine at room temperature so as to more intimately mix the ingredients. The ground material is then pressed into a can or other suitable container until it is needed for use. It is ready for immediate use, and if carefully sealed, it can be stored for an indefinite period without loss of plasticity or otherwise without deterioration.

The hereinabove designated ingredients may now be considered individually.

The preferred type of flour is a wheat flour of 95% extraction from hard winter wheat. Other types of flour from even the softest wheats, and of varying extractions can be satisfactorily used.

There is no generally satisfactory substitute for the bentonite.

Among the common alums, ammonium aluminum sulfate is preferred, since this gives the best result, but the sodium and potassium aluminum sulfates give good results.

Urea, $CO(NH_2)_2$, is preferred, but other amino compounds can be used, such as amino acetic acid.

While kerosene is a readily obtainable and relatively cheap ingredient, other petroleum distillates of reasonably high volatility can be substituted.

In place of the preferred paraffin wax, derived from petroleum, a mineral wax called ozokerite is effective, as also are certain vegetable waxes. Spermaceti can be substituted for the wax ingredient.

While potassium chloride is a suitable substitute for sodium chloride, there is no immediately apparent reason for making the substitution since the sodium chloride is normally available in ample quantities at a considerably lower cost than that of the potassium chloride.

Wall cleaners heretofore obtainable have tended to deteriorate in two usual ways. Some of the cleaners grow progressively harder in storage, so that they are too hard to knead satisfactorily and they crumble too freely in use. Other cleaners soften and become sticky with age so as to be most unsatisfactory insofar as smudging and smearing is concerned. On the other hand, the cleaner hereinabove disclosed remains in original condition after long periods of storage and can be used immediately upon removal from the container, without kneading. It produces no crumbles which would either adhere to the wall or fall or be brushed to the floor to be trampled thereon by the worker.

So that the appended claims may define the invention uniformly in parts by weight for all ingredients, including the liquids hereinabove defined in cubic centimeters (cc.) it may be here noted that since 1 cc. of water is approximately 1 gram, then for practical purposes water remains unchanged whether specified in cubic centimeters or in grams. The specific gravity of kerosene for practical purposes is 0.82 gram per cc., so that the range of kerosene may be stated as 6.0 to 10.0 parts by weight. The various waxes vary in specific gravity from about 0.90 to 0.99 gram per cc., so that the range of the waxes may be stated as 7.0 to 11.0 parts by weight.

What I claim is:

1. A cleaning composition for use on walls, wall coverings, and wall coatings and wherein the cleaner does not crumble, does not smudge, stain or adhere to the surface being cleaned, and has a long storage and use life during which it maintains its original plasticity, consisting of: 380 to 470 parts by weight of water, 270 to 300 parts by weight of wheat flour, 100 to 130 parts by weight of bentonite, 6.5 to 8.0 parts by weight of alum, 4.0 to 6.0 parts by weight of urea, 6.0 to 10.0 parts by weight of kerosene, 7.0 to 11.0 parts by weight of wax and 180 to 190 parts by weight of a material of the group consisting of sodium and potassium chloride.

2. A cleaning composition for walls, wall coverings, and wall coatings and wherein said cleaner is of dough-like consistency and can be used for cleaning without any additional material and wherein the cleaner does not crumble, does not smudge, stain or adhere to the surface being cleaned, and has a long storage life during which it maintains its original plasticity, consisting of: 433 parts by weight of water, 7 parts by weight of ammonium aluminum sulfate, 186 parts by weight of sodium chloride, 130 parts by weight of bentonite, 4 parts by weight of urea, 8.2 parts by weight of kerosene, 7.9 parts by weight of paraffin wax, and 270 parts by weight of wheat flour.

References Cited in the file of this patent

UNITED STATES PATENTS

| 1,736,375 | Sherrick | Nov. 19, 1929 |

FOREIGN PATENTS

| 10,300 | Great Britain | of 1911 |
| 878,177 | France | Sept. 28, 1942 |
| 443,795 | Great Britain | Mar. 6, 1936 |

OTHER REFERENCES

Chemical Formulary, Bennett, Van Nostrand Co., New York, vol. 2 (1935), page 70.

Chemical Formulary, Bennett, vol. 4, page 507 (1939).